United States Patent [19]
Kojima et al.

[11] 3,938,138
[45] Feb. 10, 1976

[54] TIME SWITCHING POWER SAVER SYSTEM FOR ELECTRONIC INDICATORS

[75] Inventors: Koichi Kojima, Chigasaki; Hidetoshi Kamoto, Atsugi, both of Japan

[73] Assignee: Sony Corporation, Tokyo, Japan

[22] Filed: June 17, 1974

[21] Appl. No.: 480,095

[30] Foreign Application Priority Data
June 19, 1973 Japan............................ 48-72438[U]
June 19, 1973 Japan............................ 48-72439[U]

[52] U.S. Cl.............. 340/324 R; 340/336; 340/340
[51] Int. Cl.². .......................................... G06F 3/14
[58] Field of Search .......... 340/324 R, 324 M, 334, 340/336, 340

[56] References Cited
UNITED STATES PATENTS 3,191,048  6/1965  Cowen ................................ 340/340
3,493,956  2/1970  Andrews et al. ..................... 340/334
3,631,318  12/1971  Hubbard ............................ 340/340

Primary Examiner—Marshall M. Curtis
Attorney, Agent, or Firm—Hill, Gross, Simpson, Van Santen, Steadman, Chiara & Simpson

[57] ABSTRACT

A time switching power saving system for electronic indicators which comprises an indicator operated by a battery and a time switching indication control circuit for controlling the operation of the indicator in such a manner that the indicator makes a continuous indication for a predetermined time period from the start of indication and then makes an intermittent indication after the predetermined time period has passed, so that the power consumption of the circuit is decreased without stopping the operation of the indicator.

5 Claims, 8 Drawing Figures

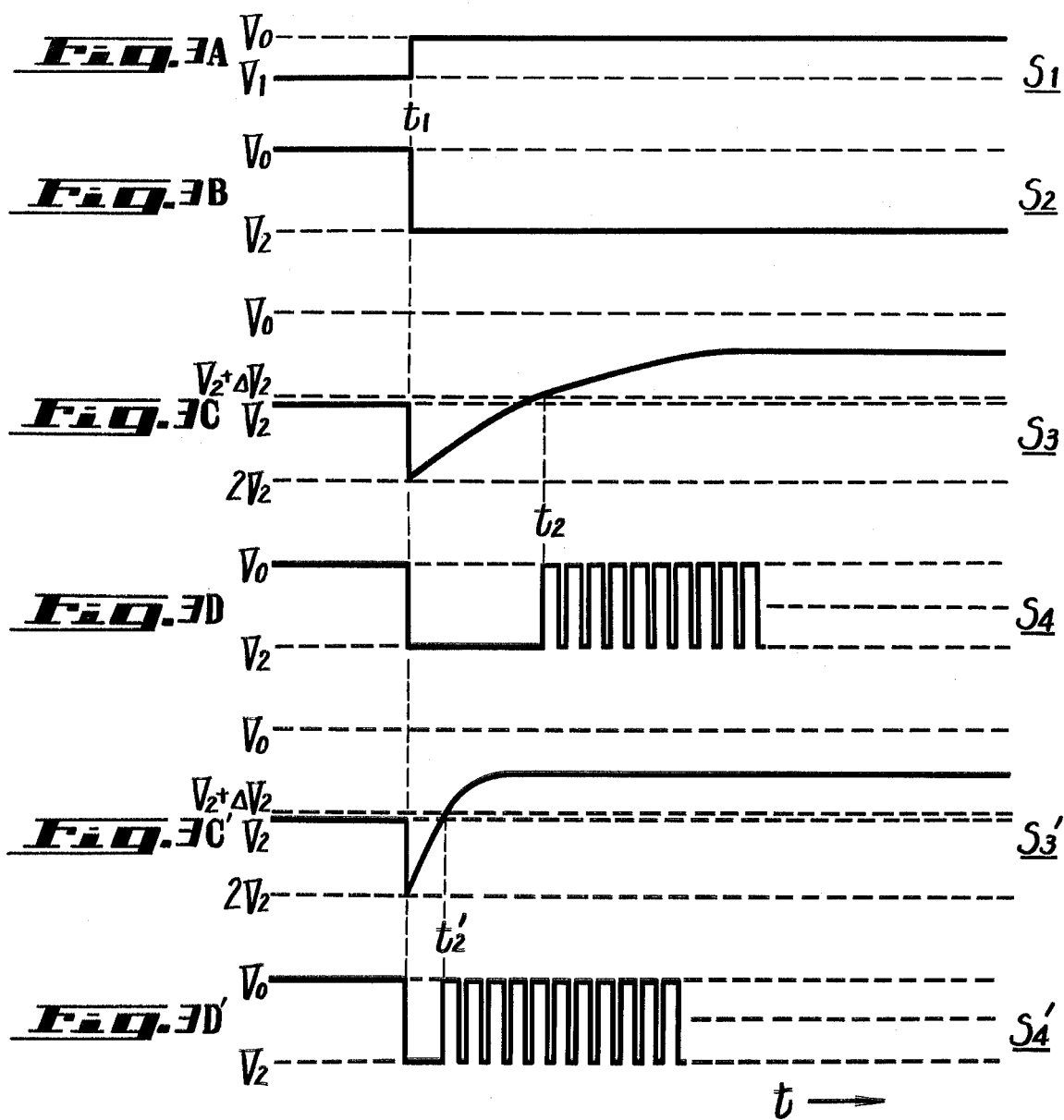

TIME SWITCHING POWER SAVER SYSTEM FOR ELECTRONIC INDICATORS

BACKGROUND OF THE INVENTION

1. Field of the Invention

This invention relates generally to an indicator power saving system and more particularly to such a system suitable for being used in a battery-operated desk-top electronic calculator.

2. Description of the Prior Art

Recently, desk-top electronic calculators have become popular and different kinds or models of such calculators have been designed and sold in the market.

Among such electronic calculators, small-sized units are especially popular and many efforts have been made to form a smaller electronic calculator.

A small-sized desk-top electronic calculator is usually designed to be operated not only by an AC line but also by a battery, and when such a small-sized and battery-operated desk-top electronic calculator is designed, one of the most important factors is how to decrease the power consumption of the calculator.

Considering the power consumption of a calculator, most power is consumed by an indicator driving circuit including an indicator.

Therefore, when a small-sized calculator is designed, it becomes one of the most important factors how to decrease the power consumption of the indicator driving circuit.

Based upon the above fact, different methods have been devised in the prior art to decrease the power consumption of the indicator and driving circuit, and one of the most popular methods known in the prior art is to provide an indication control circuit which turns off or stops the indicator driving circuit automatically after a predetermined time period, for example, after 30 seconds from the start of the indication.

However, such a method has inherent disadvantages as follows:

1. When the indicator driving circuit is turned off or stopped, it is difficult for an operator of the calculator to distinguish whether or not the calculator is in an operational condition, so that the operator is apt to misoperate the calculator.

2. The operator of the calculator is apt to forget to turn off the power switch of the calculator when he finishes calculations, because the indicator is designed to be extinguished automatically after the predetermined time period from the start of the indication even though circuits other than the indicator driving circuit are still in an operational condition and supplied with power from the battery.

In addition to the above, the prior art methods pay no attention to on the voltage across the battery. In other words, the indication control circuit provided therein is operated in the same way even when the voltage across the battery goes down, though it is desirable for such a calculator that the power consumption is decreased when the voltage across the battery goes down.

SUMMARY OF THE INVENTION

Accordingly, it is an object of this invention to provide an improved and specific indicator driving system operated by a battery in which the power consumption of the system is small.

It is another object of this invention to provide an improved and specific indicator driving system operated by a battery which is free from the inherent disadvantages of the prior art.

It is a further object of this invention to provide a specific indicator driving system operated by a battery in which the power consumption of the indication control circuit is more decreased when the voltage across the battery becomes lower than a predetermined value.

The indicator driving system according to the present invention includes an indicator operated by a battery and an indication control circuit for controlling the operation of the indicator.

The indication control circuit controls the operation of the indicator in such a manner that the indicator makes a continuous indication for a predetermined time period from the start of an indication and the indicator makes an intermittent indication after the predetermined time period, has passed, so that the power consumption of the indicator driving circuit is decreased without stopping the operation of the indicator.

The indicator driving system according to the present invention further comprises means for decreasing the predetermined time period when the voltage across the battery goes down below a predetermined value, so that the power consumption of the circuit is more decreased when the voltage across the battery goes down below the predetermined value.

DESCRIPTION OF THE PREFERRED EMBODIMENT

Figure 1:
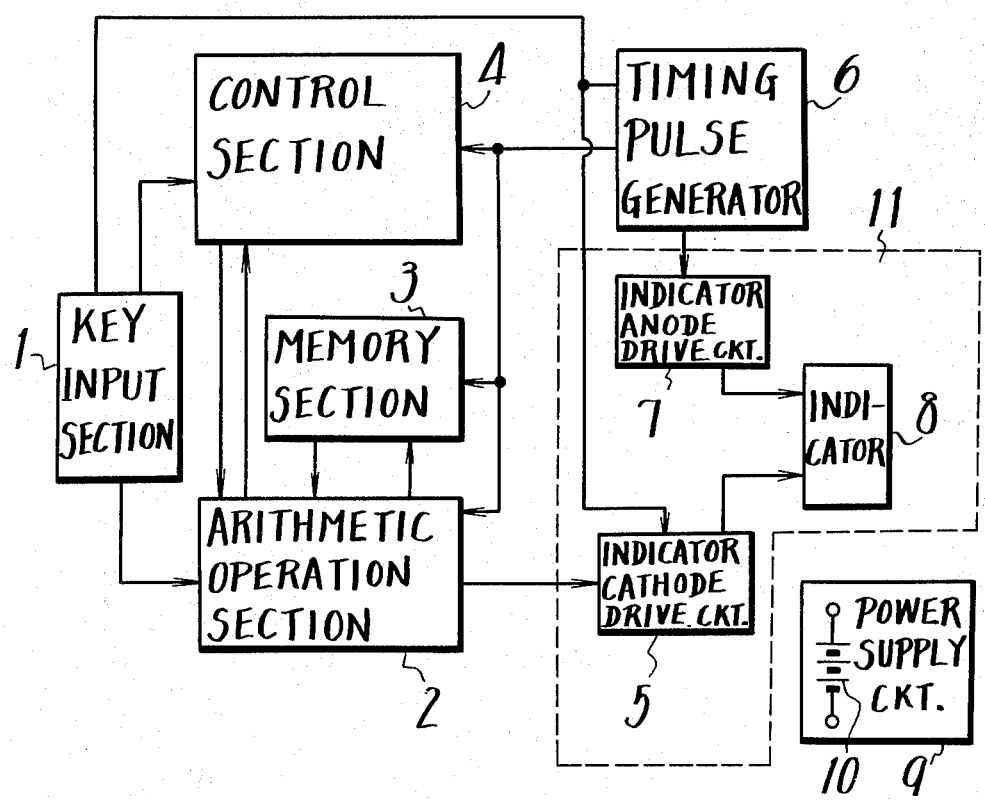
FIG. 1 is a simplified block diagram of a desk-top electronic calculator to which an indicator driving system according to the present invention may be applied.

First of all, an electronic calculator to which a time switching indicator driving system according to this invention may be applied will be generally described with reference to FIG. 1. As shown, such electronic calculator includes a key input section 1 from which signals are emitted in response to the selective actuation of a numeral key and an operation-key. An arithmetic operation section 2 is supplied with the numeral key signal from the key input section 1 and performs an arithmetic operation. A memory section 3 comprises a shift register and a memory register for the arithmetic operation and indication. A control section 4 is supplied with the signal emitted from key input section 1 in response to operation of an operation-key and includes a state control circuit. A cathode driving circuit 5 is connected to the cathodes of an indicator 8. The indicator 8 may include, for each place or numerical order to be depicted, for example, for the tens, hundreds, thousands etc., seven cathodes arranged in a figure 8 adjacent to an anode which may be common to the seven cathodes (not shown). The cathodes are selectively activated so that an electrical discharge is produced between the anode and the selected cathodes for indicating a predetermined numeral or digit.

Referring again to FIG. 1, it will be seen that the illustrated electronic calculator further includes the usual timing pulse signal generator 6 which generates clock pulses and includes an anode timing counter for successively driving the anode of indicator 8, such as a bit timing counter, a digit timing counter and the like. An anode driving circuit 7 for the indicator 8 is supplied with the pulse signals from the anode timing counter of the timing pulse generator 6 and successively drives the anodes of the indicator 8 for a predetermined time period based upon the signals from the generator 6. A power supply circuit 9 including a battery 10 is provided for supplying operational voltage to each of the above sections and circuits 1 to 7.

A circuit encircled by dotted lines designates as a whole an indicator driving circuit or section 11.

The present invention is directed to provide an indicator driving system including the indicator driving circuit 11 in combination with the power supply circuit 9. Accordingly, a detailed explanation will be hereinafter given with reference to FIGS. 2 and 3 centering around the indicator driving circuit 11 in combination with the power supply circuit 9. A detailed explanation for the other sections or circuits 1 to 4 and 6 of FIG. 1 will be omitted for the sake of brevity.

Figure 2:
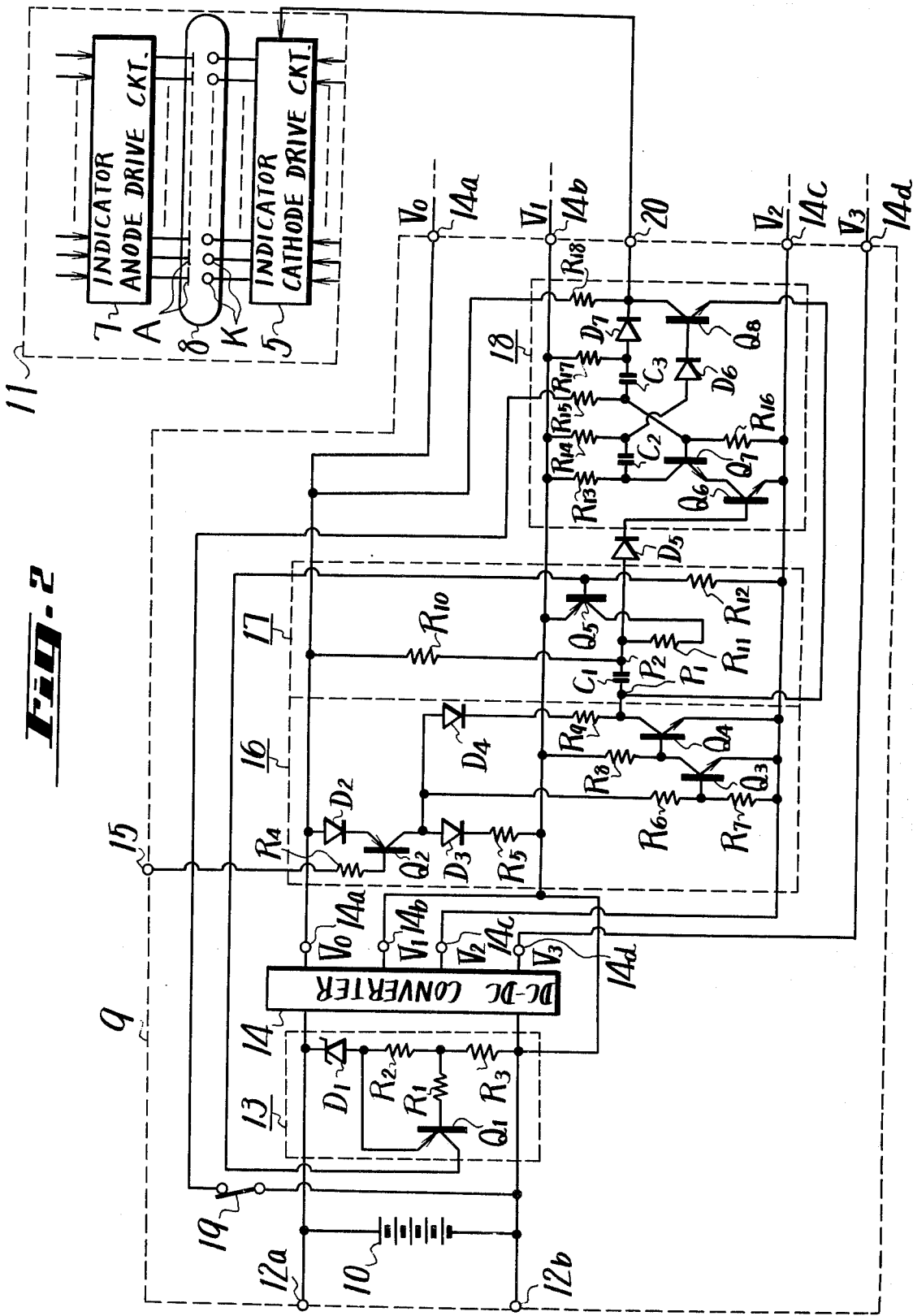
FIG. 2 is a schematic diagram of an indicator driving system according to the present invention which includes an indicator driving circuit in combination with a power supply circuit of FIG. 1, and FIGS. 3A to 3D are waveform diagrams to be used for explaining the operation of the circuit shown in FIG. 2.

Referring to FIG. 2, there is shown a schematic diagram of the indicator driving circuit 11 in combination with the power supply circuit 9 of FIG. 1, wherein like reference characters or numerals are used to designate like elements used in FIG. 1.

In FIG. 2, the indicator 8 is constructed in a form of flat tube including therein groups of cathodes, each group being formed in an 8-shape for each figure, and anodes, each corresponding to each group of cathodes for each figure, so as to display a plurality of figures, where cathodes K and anodes A are shown in a simplified manner.

The indicator anode drive circuit 7 is arranged to deliver an anode voltage in sequence to the anode A for each figure circularly or in a time-sharing manner. The indicator cathode drive circuit 5 is directed to feed a cathode voltage to desired indicating members of the cathodes K disposed in an 8-shape timing to the anode A.

The construction of the power supply circuit 9 will hereinbelow be summarized. In this example, the battery 10 is shown as, for example, an electrically chargeable nickel-cadmium battery the positive and negative electrodes of which are respectively connected to external power input terminals 12a and 12b for the supply of a charging voltage to the battery 10. Reference numeral 13 indicates a voltage detector circuit for detecting a voltage of the battery 10 and 14 a DC-DC converter connected to the battery 10, for producing DC voltages of desired values. In this example, the DC-DC converter 14 is provided with four voltage supply terminals 14a, 14b, 14c and 14d respectively having voltages $V_0$, $V_1$, $V_2$ and $V_3$ of 0, −9, −17 and −210 volts, by way of example. These voltages are supplied to each of the sections or circuits 1 to 7 of the electronic calculator shown in FIG. 1 as their operational voltages. For the sake of brevity, however, connections from the voltage supply terminals 14a to 14d to each of the sections or circuits 1 to 7 are omitted in the figure.

Reference numeral 17 represents a time switching circuit the switching period of which is variable controlled by an output voltage of the voltage detector circuit 13. That is, in the case when the voltage of the battery 10 is, for example, 6 volts at a normal time, the switching period is controlled to 30 seconds but when the voltage of the battery 10 is lowered to, for example, about 4.3 to 4.7 volts, the switching period is controlled to, for example, 5 seconds.

Reference numeral 18 denotes an indication control circuit which is controlled by an output of the time switching circuit 17 and adapted to control the indicator 8 cyclically and intermittently. Further, reference numeral 16 indicates a control circuit to control these time switching circuit 17 and indication control circuit 18. Reference numeral 15 denotes an input terminal which is led from the above described control circuit 16 and applied with an indication instruction signal for starting the indication at a time when the pressing of a key or an arithmetic operation has been finished. By the application of this indication instruction signal, the time switching circuit 17 starts its time counting and also the indicator 8 starts its indication.

A description will next be given in detail on the construction of each circuit mentioned above.

At first, the voltage detector circuit 13 will be described. The circuit 13 is composed of a PNP-type transistor $Q_1$, a Zener diode $D_1$, and resistors $R_1$, $R_2$ and $R_3$. The positive electrode of the battery 10 is connected to the cathode of the Zener diode $D_1$ and the anode of the Zener diode $D_1$ is connected to the emitter electrode of the transistor $Q_1$ while the anode of the Zener dioed $D_1$ is also connected through a resistor $R_2$ and further through a resistor $R_1$ to the base electrode of the transistor $Q_1$. The connection mid-point between the resistors $R_1$ and $R_2$ is connected through a resistor $R_3$ to the negative electrode of the battery 10. The negative electrode of the battery 10 is also connected to the voltage supply terminal 14b of the DC-DC converter 14. The collector electrode of the transistor $Q_1$ is connected to the base electrode of a transistor $Q_5$, which will be described later, of the time switching circuit 17. The transistor $Q_1$ is adapted to be conductive when the voltage of the battery 10 is normal in value and nonconductive when the voltage is lowered below a predetermined voltage, for example, a voltage below about 4.3 to 4.7 volts as described above. The Zener diode $D_1$ is served to provide a reference voltage for the above purpose. The positive and negative electrodes of the battery 10 are respectively connected to the input side of the DC-DC converter 14.

Next, the control circuit 16 will be described. This control circuit 16 is composed of transistors $Q_2$, $Q_3$, $Q_4$, diodes $D_2$, $D_3$, $D_4$ and resistors $R_4$, $R_5$, $R_6$, $R_7$, $R_8$, $R_9$. In this circuit, the transistor $Q_2$ is of a PNP-type and the transistors $Q_3$ and $Q_4$ are of an NPN-type. The emitter electrode of the transistor $Q_2$ is connected to the cathode of the diode $D_2$ while the anode of the diode $D_2$ is connected to the voltage supply terminal 14a, and the collector electrode of the transistor $Q_2$ is connected through a series circuit of the diode $D_3$ and the resistor $R_5$ to the voltage supply terminal 14b. The anode of the diode $D_3$ is located at the collector side of the transistor $Q_2$. Further, the base electrode of the transistor $Q_2$ is connected through the resistor $R_4$ to the indication instruction signal input terminal 15. The collector electrode of the transistor $Q_2$ is also connected through a series circuit of the resistors $R_6$ and $R_7$ to the voltage supply terminal 14c. The collector electrode of the transistor $Q_3$ is connected through the resistor $R_8$ to the voltage supply terminal 14b and at the same time the base electrode thereof is connected to the connection mid-point of the resistors $R_6$ and $R_7$ while the emitter electrode thereof is connected to the voltage supply terminal 14c. The collector electrode of the transistor $Q_4$ is connected through a series circuit of the resistor $R_9$ and the diode $D_4$ to the collector electrode of the transistor $Q_2$. In this case, the anode of the diode $D_4$ is located at the side of the transistor $Q_2$. The base electrode of the transistor $Q_4$ is connected to the collector electrode of the transistor $Q_3$ and the emitter electrode of the transistor $Q_4$ is connected to the voltage supply terminal 14c. The transistors $Q_3$ and $Q_4$ are rendered to be reciprocally ON and OFF in response to ON and OFF of the transistor $Q_2$ which are caused by signals applied to its base electrode.

In the above circuit 16, the diode $D_2$ is used to prevent the transistor $Q_2$ from being destroyed by a large backward voltage impressed between the base-emitter electrodes thereof at its nonconductive state. The diode $D_3$ serves to prevent the transistor $Q_3$ from being accidentally turned ON by its base current applied through the resistors $R_5$ and $R_6$ when the transistor $Q_2$ is non-conductive. Further, the diode $D_4$ is inserted so that the switching characteristic of the transistor $Q_3$ is not deteriorated due to the current flowing from a point $P_1$, through the resistors $R_9$ and $R_6$ to its base electrode when the transistor $Q_2$ is turned OFF.

The time switching circuit 17 will next be discussed. The time switching circuit 17 is composed of the transistor $Q_5$, resistors $R_{10}$, $R_{11}$, $R_{12}$ and a capacitor $C_1$. The collector electrode of the transistor $Q_4$ of the control circuit 16 is connected through the capacitor $C_1$ for charging and discharging and further through the resistor $R_{10}$, which is connected in series to the former, to the voltage supply terminal 14a. The connection point between the collector electrode of the transistor $Q_4$ and the capacitor $C_1$ is referred to as $P_1$ while the connection point between the capacitor $C_1$ and the resistor $R_{10}$ is referred to as $P_2$. The indicator control circuit 18 will now be discussed. The point $P_2$ connects with the anode of diode $D_5$. The cathode joins with the base of transistor $Q_7$, the emitter of which connects with $V_2$. The collector electrode of the transistor $Q_7$ is connected through the capacitor $C_2$ and further through the resistor $R_{14}$ to the voltage supply terminal $14_b$. The connection point of the capacitor $C_2$ and the resistor $R_{14}$ is connected to the anode of the diode $D_6$, and the cathode of the diode $D_6$ is connected to the base electrode of the transistor $Q_8$. The emitter of the transistor $Q_8$ is connected to the collector electrode of the transistor $Q_4$ of the aforementioned control circuit 16. The collector electrode of the transistor $Q_8$ is connected through the resistor $R_{18}$ to the voltage supply terminal 14a and also to the cathode of the diode $D_7$ while the anode of the diode $D_7$ is connected through the capacitor $C_3$ to the base electrode of the transistor $Q_7$. The anode of the diode $D_7$ is further connected through the resistor $R_{17}$ to the voltage supply terminal 14b. The base electrode of the transistor $Q_7$ is then connected through the resistor $R_{15}$ to one end of a switch 19, and the other end of the switch 19 is connected to the negative electrode of the battery 10, that is, to the voltage supply terminal 14b in this case. The switch 19 is opened when an input DC voltage (charging voltage) is supplied to the external power input terminals 12a and 12b but closed otherwise, which will be described later. The collector electrode of the transistor $Q_8$ is connected to a control signal output terminal 20. The output signal from the terminal 20 is applied to the indicator cathode drive circuit 5. Meanwhile, a diode $D_5$ is connected to prevent the transistor $Q_6$ from being broken down by a reverse biasing voltage applied between the base-emitter electrodes. The diode $D_7$ is provided so as to sharpen the waveform of the output at the control signal output terminal 20 by charging the capacitor $C_3$ through the resistor $R_{17}$ and discharging the same through the diode $D_7$ and the collector-emitter electrodes of the transistor $Q_8$.

A description will hereinbelow be given on the operation of the indicator driving system shown in FIG. 2 with reference to the wave-forms of FIG. 3.

At first, assuming that the voltage of the battery 10 is normal, the transistor $Q_1$ of the voltage detector circuit 13 is in a conductive state, so that the transistor $Q_5$ of the time switching circuit 17 is turned OFF and the resistor $R_{11}$ is disconnected from the circuit 17. The waveform of the indication instruction signal applied to the indication instruction signal input terminal 15 is shown in FIG. 3A as $S_1$. In this case, the voltage $V_1$ of the indication instruction signal $S_1$ indicates the absence of an instruction, whereas the voltage $V_0$ corresponds with the completion of the key pressing or arithmetic operation. Initially, when the voltage of the signal $S_1$ is $V_1$, the transistor $Q_2$ is in a conductive state. Therefore, the transistor $Q_3$ is in a conductive state while the transistor $Q_4$ is in a non-conductive state. Accordingly, the potential at the point $P_1$ ($S_2$ of FIG. 3B) is substantially $V_0$ and the potential at the point $P_2$ ($S_3$ of FIG. 3C) is substantially $V_2$. That is, in this case, the capacitor $C_1$ is being charged through the following path: voltage supply terminal 14a — diode $D_2$ — emitter-collector of transistor $Q_2$ — diode $D_4$ — resistor $R_9$ — capacitor $C_1$ — diode $D_5$ — base/emitter of transistor $Q_6$ — voltage supply terminal 14c. As mentioned above, in this case the transistor $Q_6$ of the indication control circuit 18 is in a conductive state. Further, the potential of the emitter electrode of the transistor $Q_8$ is $V_0$ similarly as that of the point $P_1$. For this reason, the output voltage of the control signal output terminal 20 of the indication control circuit 18 ($S_4$ of FIG. 3D) becomes $V_0$ and maintained constant. In this case, the indicator cathode drive circuit 5 is arranged to feed no cathode voltage to any cathode thereof and hence no indication is permitted in the indicator 8.

Next, when the indication instruction signal of $V_1$ is applied to the terminal 15 at a time $t_1$ as shown in FIG. 3A, the transistor $Q_2$ is turned OFF with the result that the transistor $Q_3$ is also turned OFF while the transistor $Q_4$ is turned ON. For this reason, the potential $S_2$ at the point $P_1$ is immediately lowered from $V_0$ to $V_2$ as shown in FIG. 3B. Further, the switching signal $S_3$ at the point $P_2$ is lowered from $V_2$ to $2V_2$ as shown in F FIG. 3C. Accordingly, the transistor $Q_6$ of the indication control circuit 18 is turned OFF and the emitter potential of the transistor $Q_8$ which is equal to that of the point $P_1$ becomes $V_2$. Consequently the astable multi-vibrator of the indication control circuit 18 does not operate as an oscillator yet. However, since the emitter potential of the transistor $Q_8$ becomes $V_2$, this transistor $Q_8$ is turned ON and the voltage $S_4$ at the control signal output terminal 20 becomes $V_2$ as shown in FIG. 3D. For this reason, the indicator cathode drive circuit 5 is controlled to cause the indicator 8 to start an indication in accordance with signals supplied from the arithmetic operation section 2 of FIG. 1.

The capacitor $C_1$ of the time switching circuit 17 is then charged through a path of voltage supply terminal 14a — resistor $R_{10}$ — capacitor $C_1$ — collector.emitter of transistor $Q_4$ — voltage supply terminal 14c with a time constant decided by the values of these capacitor $C_1$ and the resistor $R_{10}$. When the switching signal $S_3$ of this point $P_2$ is increased to a potential to turn on the transistor $Q_6$, that is, $V_2 + V_2$ such as shown in FIG. 3C, the transistor $Q_6$ is turned ON with the result that the astable multivibrator of this indication control circuit 18 starts its oscillation and an oscillting output is produced at the control signal output terminal 20 from a time $t_2$ as shown in FIG. 3D. In this case, a time period between $t_1$ and $t_2$ is, for example, 30 seconds and afterwards the indicator 8 is continuously and intermittently controlled such that lighting for substantially 0.5 seconds and non-lighting for substantially 1 seconds, both being alternately repeated. Accordingly, for about 30 seconds after the completion of arithmetic operation or key pressing, the indicator 8 is continuously lit and after 30 seconds has passed, the indicator 8 repeats the intermittent indication as described above.

Next, when the voltage of the battery 10 is lowered below a predetermined voltage, the transistor $Q_1$ is turned OFF, so that the transistor $Q_5$ of the time switching circuit 17 is turned ON and the resistor $R_{11}$ is connected to the circuit 17. In this case, since the value of the resistor $R_{11}$ is selected to be quite small as compared with that of the resistor $R_{10}$, the time constant for charging the capacitor $C_1$ is determined mainly by the resistor $R_{11}$ and the capacitor $C_1$. In this case, when the indication instruction signal of $V_1$ is applied to the terminal 15 at the time $t_1$, the indicator 8 begins to make a continuous indication in the same manner as described above. However, as shown in FIG. 3C', the potential $S'_3$ at the point $P_2$ increases enough to turn the transistor $Q_6$ ON at a time $t'_2$ which is earlier than the aforementioned time $t_2$, and when the transistor $Q_6$ is turned ON, the astable multivibrator of the indication control circuit 18 starts its oscillation. As a result, the indicator 8 is lighted continuously, for example, for 5 seconds and afterwards the indicator 8 is repeatedly controlled in the same manner as described above. FIG. 3D' shows a waveform of a voltage $S'_4$ at the output terminal 20 in that case.

With the above descrived system, the external power input terminals 12a and 12b are provided to charge the battery 10 and also to drive the whole system by the external power input. In this case, however, a DC voltage produced by rectifying a commercial AC power is normally used as the external power input, so that it is not particularly required to economize power, that is, the indicator 8 is not required to make the intermittent indication. In this case, the aforementioned switch 19 is opened automatically such that the switch 19 is interlocked with the engagement of, for example, a plug or a jack which is used for the connection of the external power to the input terminals 1a and 1b, and the base electrode of the transistor $Q_7$ of the indicator control circuit 18 is reverse biased to make the astable multivibrator nonoperating. In other words, the output voltage $S_4$ of the control signal output terminal 20 is always kept to be the value of $V_2$ after the voltage $S_1$ of the indication instruction signal has become $V_0$ and the indicator 8 is always controlled to make a continuous indication.

According to the present invention as described above, the system is composed of the indicator, the battery for supplying a power to this indicator, the voltage detector circuit for detecting the voltage of this battery, an instruction input and control circuit for driving the time switching circuit, the time switching circuit in which a switching period is variably controlled by the detected output of this voltage detector circuit so that the switching period becomes shorter when the voltage of the battery becomes lower than a predetermined value, and the indication control circuit which is controlled by the output signal of this time switching circuit to control the indicator cyclically and intermittently. With the above construction, the indicator makes a continuous indication for a switching period of the time switching circuit which is operated by an instruction signal for an indication operation and the indicator makes an intermittent indication after the switching period has passed. As a result, the system has the following advantages:

1. Wasteful consumption of a battery according to the indicator can be remarkably reduced without spoiling the function of the indicator.

2. When the voltage of the battery is lowered, the power consumption of the system is more economized and further the system itself can indicate that the voltage of the battery has decreased by shortening the switching period of the switching circuit.

3. Negligence in turning-off a power switch can be indicated by the intermittent indication of the indicator.

4. It is not necessary to provide a battery indicator lamp which indicates the decrease in the voltage value of a battery.

Although an illustrative embodiment of the invention has been described with reference to the accompanying drawings, it is to be understood that the invention is not limited to that precise embodiment, and that various changes and modifications may be effected without departing from the scope or spirit of the invention. Further, it will be noticed that a so-called Nixie tube, a liquid crystal indicator device, a luminescent diode or the like can be used as the indicator.

We claim as our invention:

1. A time switching power saver circuit for a battery powered electronic indicator comprising:
   A. An indicator for displaying figures connected to be supplied with a DC power supply voltage by a battery;
   B. control means having an indicator instruction signal input, said means effective to control a time switching means in accordance with the state of an induced instruction time signal;
   C. switching means connectedd to said control means, said time switching means generating in response to said instruction signal a switching signal; and
   D. indication control means connected between said time switching means and said indicator for receiving said switching signal to control the indication of the latter, said indication control means being responsive to said switching signal for controlling the indicator to first make a continuous indication for a predetermined time period in response to the indication signal and to later automatically make an intermittent indication also in response to said switching signal.

2. A time switching circuit according to claim 1 further comprises:
   A. voltage detecting means for detecting the voltage across said battery; and
   B. means connected between said voltage detecting means and said time switching means for shortening said continuous indication predetermined time period when the detected voltage becomes lower than a predetermined value.

3. A time switching circuit according to claim 2 wherein said time switching means includes:
A. a first time constant circuit, the time constant of which corresponds to said predetermined time period; and
B. a second time constant circuit, the time constant of which is shorter than that of said first time constant circuit;

whereby said means connected between said voltage detecting means and said time switching means switches said first time constant circuit to said second time constant circuit when said detected voltage becomes lower than said predetermined value.

4. A time switching circuit according to claim 1 wherein said indication control means includes an astable multivibrator controlled by the switching signal from said time switching means.

5. A time switching circuit according to claim 1 in which said indication control means connects with an interlock switch actuated by plugging an alternating current power source, said switch effective to cause continuous indication by said indicator in response to the instruction signal.

* * * * *